A. H. NEULAND.
ELECTROMAGNETIC POWER TRANSMITTING APPARATUS.
APPLICATION FILED MAY 3, 1917.
1,266,303.
Patented May 14, 1918.
3 SHEETS—SHEET 1.
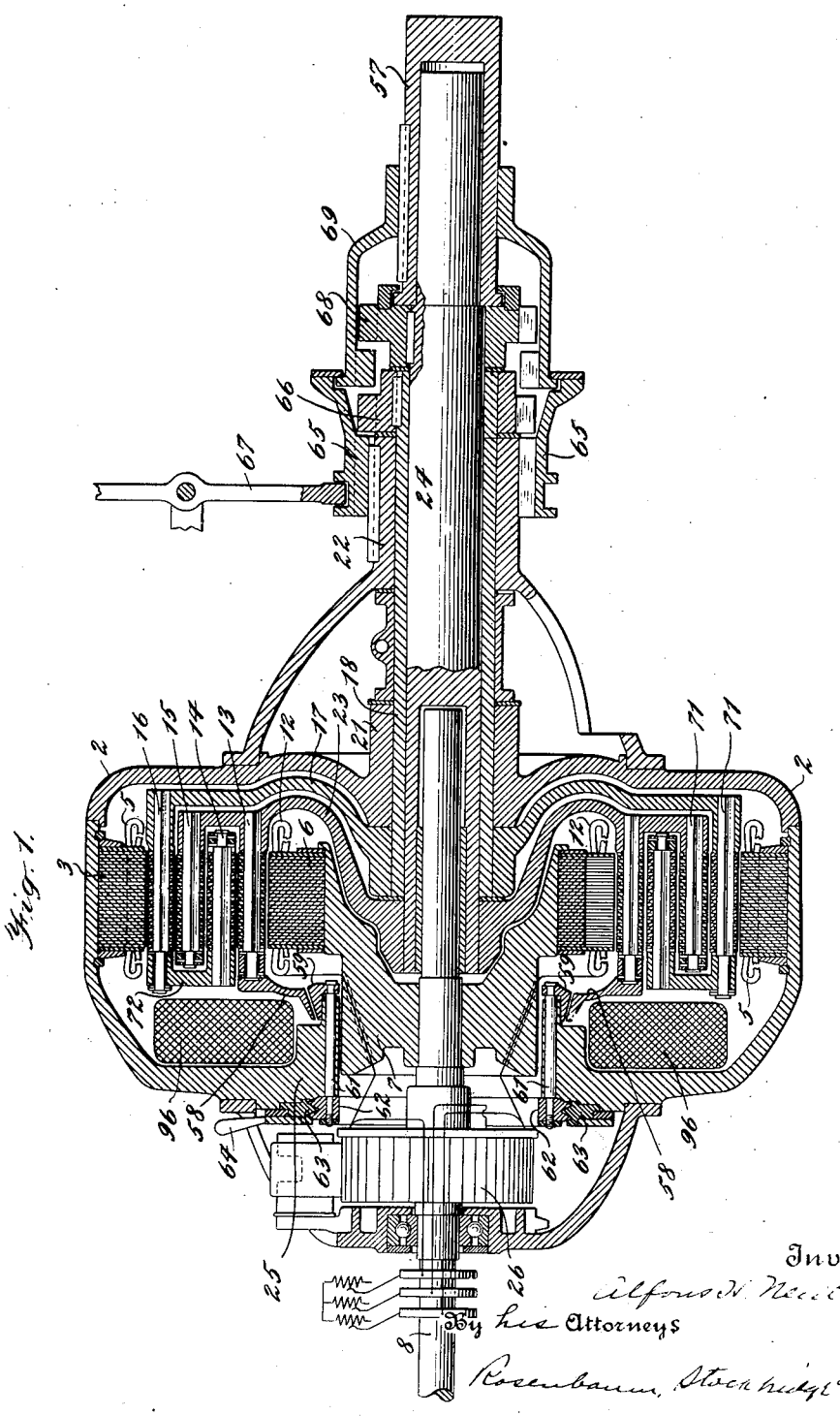

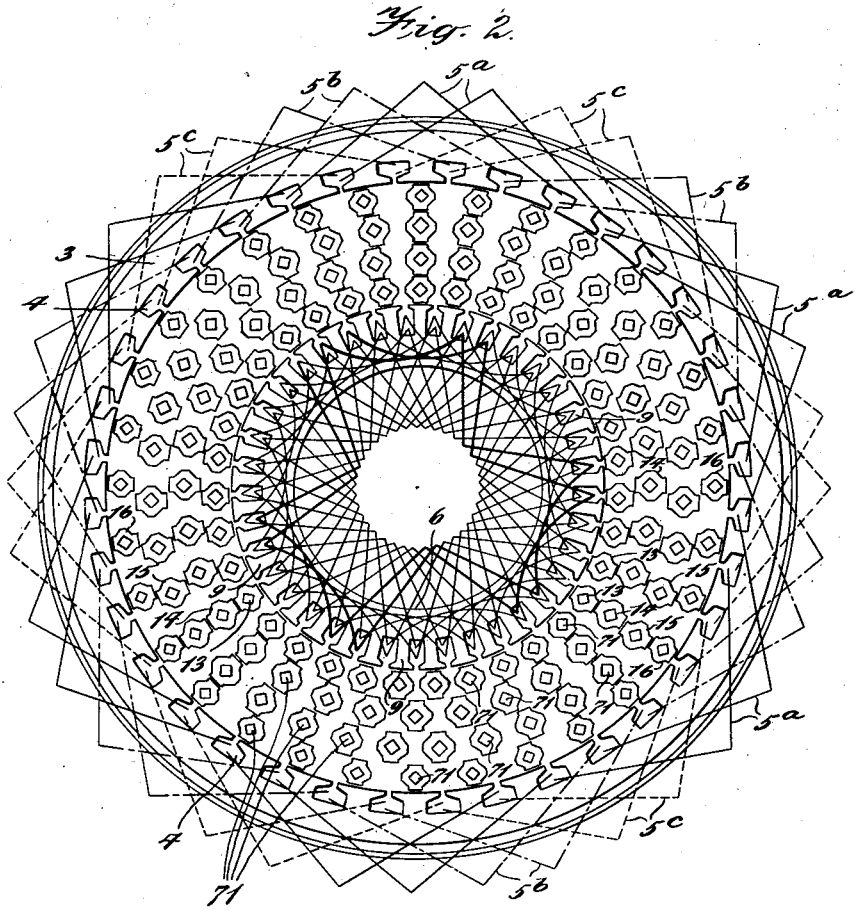

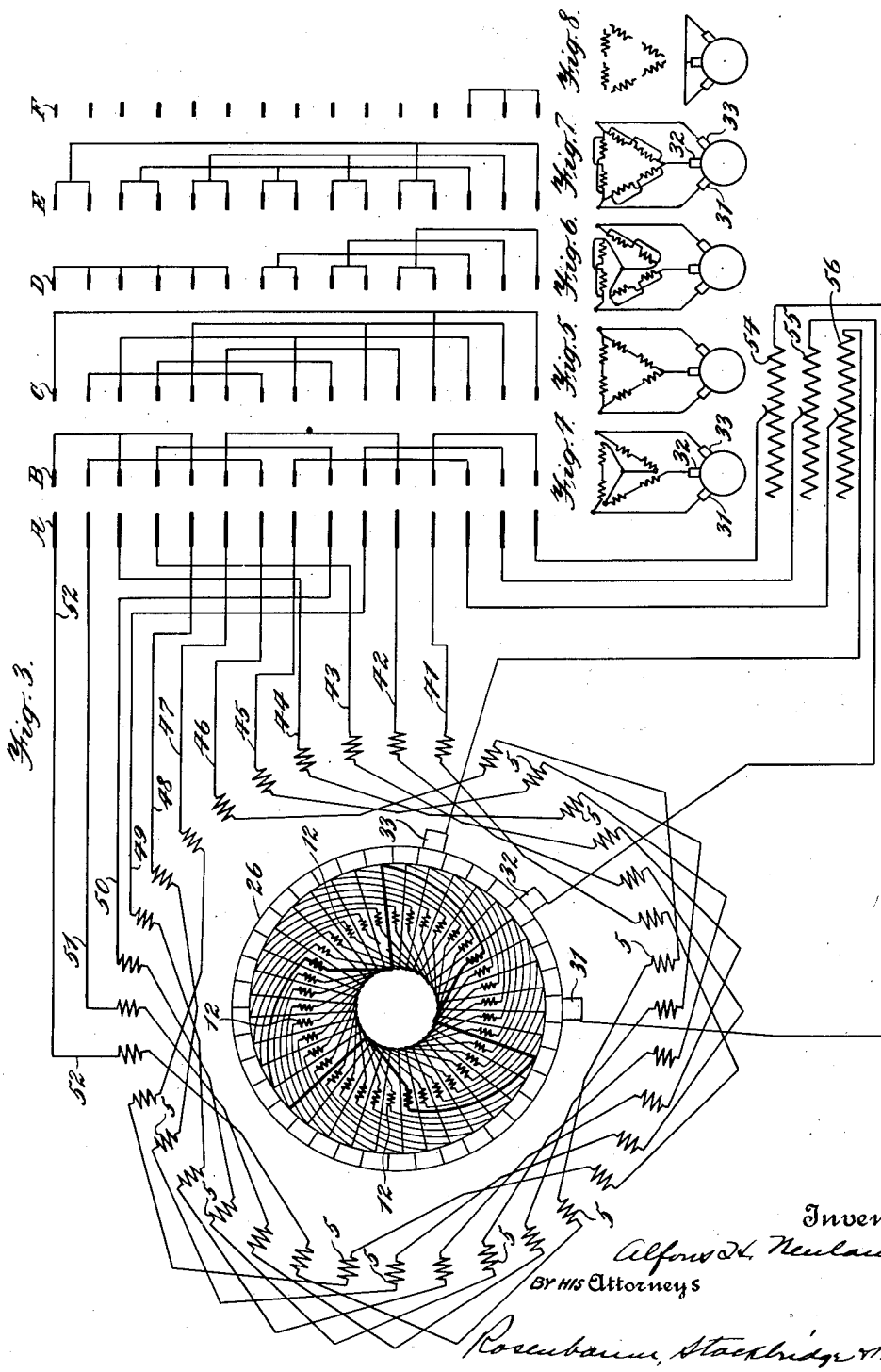

UNITED STATES PATENT OFFICE.

ALFONS H. NEULAND, OF SAN FRANCISCO, CALIFORNIA.

ELECTROMAGNETIC POWER-TRANSMITTING APPARATUS.

1,266,303.      Specification of Letters Patent.      Patented May 14, 1918.

Original application filed August 8, 1914, Serial No. 855,873. Divided and this application filed May 3, 1917. Serial No. 166,136.

*To all whom it may concern:*

Be it known that I, ALFONS H. NEULAND, a subject of the Czar of Russia, residing at San Francisco, in the county of San Francisco and State of California, have invented certain new and useful Improvements in Electromagnetic Power-Transmitting Apparatus, of which the following is a full, clear, and exact description.

The invention relates to power transmitting apparatus and particularly to such apparatus of the electromagnetic type, which is adapted to transmit power from one rotatable element to another, as from one shaft to another.

This application is divisional of my copending application, Serial Number 855,873, filed August 8, 1914.

An object of my invention is to provide a power transmitting apparatus in which the driven member may rotate at a different angular velocity than the driving member and in which the speed of the driven member may be varied with relation to the speed of the driving member. The speed of the driving member may be maintained constant at the most efficient speed of the prime mover and the speed of the driven element may be varied from zero to synchronism with the driving element or above the speed of the driving element, and this may be accomplished without the dissipation of energy in external resistances and the like.

Another object of the invention is to provide a power transmitting apparatus in which not only the speed of the driven element may be varied with relation to the speed of the driving element, but in which the direction of rotation of the driven element may be reversed with relation to the direction of rotation of the driving element, and this may also be accomplished simply and without the external dissipation of energy.

Another object of the invention is to provide a power transmitting apparatus in which the driven element is rotatable at an adjustable fixed speed at all loads for a constant speed of the driving element, that is, the speed of the driven member may be adjusted to any angular velocity, and such velocity will remain constant independent of variations of the load.

The invention possesses other advantageous features, some of which, with the foregoing, will be set forth at length in the following description where I shall outline in full that form of the invention which I have selected for illustration in the drawings accompanying and forming part of the present specification. In the drawings I have shown only one specific form of my generic invention, but it is to be understood that I do not limit myself to such form because my invention may be embodied in a multiplicity of forms, each being a species of my said invention. It is also to be understood that by the claims succeeding the description of my invention, I desire to cover the invention in whatever form it may be embodied.

Embodiments of my invention have means for producing a torque between an armature and a field element and allowing the torque to move the field element either in the same or in the opposite direction to the armature. The armature is connected to either the driving or the driven shaft, and the field element is connected to the other shaft, that is, when the armature is connected to the driving shaft, the field element is connected to the driven shaft. This is the arrangement which will generally be employed, since the field element is more adapted to rotate at speeds lower than the armature and since the speed of rotation of the driving element or prime mover is usually higher at its most economical speed than the desired speed of the driven element.

Specifically the field element comprises two inductor members, one of which is stationary and the other of which is rotary, and which coöperate to distribute a unidirectional flux through one or more rotating flux paths and thereby produce a revolving field. This flux path and hence the revolving field has a different angular velocity than the rotating inductor. To effect this the inductors consist each of a circular series of spaced magnetic bars, the two series being concentric and each being mounted for independent rotation, while either or both of them may be locked against rotation. The magnetizing coil is arranged adjacent the inductors, and the bars of the two inductors are so relatively arranged that the torque produced between the inductors and the armature current tends to rotate one inductor in one direction and the other in the opposite direction. Preferably this is obtained by a difference in angular pitch between the bars of the two inductors. Means are provided for alternately coupling the two inductors to the driven element, and thus a reversal of rotation of the driven element is obtained without reversing the direction of rotation of the driving element.

The torque and slip are dependent on the strength of the field, the current in the armature and the power factor of the armature current, and a variation in the torque and slip is obtained by either varying the field current, or by varying the resistances of the armature circuit, or by both.

With the armature rotating and the armature circuits closed through a variable resistance or short circuited, a torque is produced between the rotative inductor and the armature by reason of their inductive relation. In order to produce a high starting torque a sufficient external resistance must be inserted in the armature circuit to consume the entire energy generated therein. This causes the efficiency of the machine at start and at low speeds to be low. A much higher efficiency and a greater starting torque is obtained by introducing the armature current, which would otherwise be consumed in the external resistances, into a winding arranged on the stator, and for this purpose the armature has been provided with a commutator and brushes. The leads from the stator winding are so connected to the brushes that the direct currents collected at the brushes when the inductor is stationary, will traverse the stator windings in such a way that a flux will be produced which produces a torque between the stator and the inductor, which adds itself to the torque resulting from the reaction between the field and the current in the armature. As the driven member begins to rotate the field progresses in the direction of the armature rotation and the neutral point on the commutator rotates at the same angular velocity as the field and produces polyphase currents at the brushes. These polyphase currents circulate through the windings of the stator and create a revolving field, the angular velocity of which equals the angular velocity of the field due to the rotation of the driven inductor or field element, and these two fields have quadrature relation at standstill of the driven or field element and retain this relation at all speeds of said element. Further, the generated potential in the constant speed armature is highest when the field is stationary, and as the driven element begins to rotate, allowing the field to follow, the armature potential is proportionately decreased. Furthermore, a counter electromotive force is generated in the stator winding, due to the progression of the flux in the stator which opposes the armature potential and again lowers the resultant potential, thus limiting the current in the windings until a point in the speed is reached where the counter E. M. F. due to the stator windings equals that generated in the armature. When the turns on the armature equal the turns on the stator this point is reached at a slip of substantially fifty per cent. The winding on the stator is so arranged that portions thereof may be cut out, thereby decreasing the counter E. M. F. and allowing an increase of current, consequently enabling the speed to increase. In this way a number of speeds are obtained above which the speed of the driven element cannot rise even though it were free from any load. An adjustment of the speed, between the steps obtained by varying the turns of the winding, is obtained by inserting a variable resistance between the armature and stator windings, and this resistance is employed only when speeds intermediate the steps are desired.

In the drawings accompanying and forming part of the present specification:

Figure 1 is a longitudinal section of one embodiment of my invention;

Fig. 2 is a cross-section of the machine shown in Fig. 1, the armature and stator windings being shown diagrammatically;

Fig. 3 is a diagrammatic representation of the electric circuits of the machine, including contacts of a controlling device;

Fig. 4 is a continuation of Fig. 3 showing one form of connecting the circuits at the controlling device, and a diagrammatic representation of the resultant connections;

Figs. 5, 6, 7 and 8 are other continuations of Fig. 3, showing various connections of the electric circuits and diagrammatic representations of these connections.

In the illustrated embodiment of the invention the apparatus comprises a frame or stator 2, on which is arranged the laminated stator element 3, which is annular in shape and which is preferably provided with a plurality of semi-closed slots 4, for receiving the coils 5 of the stator winding. Arranged within the stator and concentrically disposed with relation thereto is the laminated armature element 6 which is annular in form and which is mounted on the hub 7 secured to the shaft 8. The armature element is preferably provided with a plurality of semi-closed slots 9 in which the coils 12 of the armature winding are embedded.

Arranged between the stator element and the armature element and concentric therewith is a field element which consists of two inductor members, each comprising two concentric series 13—15 and 14—16 of laminated bars, the bars being arranged parallel to the axis of the machine. The alternate series of bars 14 and 16 are mounted on a spider 17 which is secured to the sleeve or hollow shaft 18 journaled in the bearings 21 and 22 on the frame 2. The series of bars 13 and 15 are mounted on a spider 23 which is secured to the shaft 24 journaled in a hollow shaft 18. The shaft 24 is formed hollow at its inner end to provide a bearing for the armature shaft 8.

Means are provided for locking either or both inductor members against rotation, or for allowing either member to rotate, as will be hereinafter set forth, it being sufficient at this time to state that either member, that is, bar series 13—15 or 14—16, may be locked against movement and the other member allowed to rotate.

The hub 7 which carries the armature element 6 extends into a cylindrical projection 25 on the frame. Mounted on the cylindrical projection is the magnetizing coil 96, the magnetic circuit of which includes the frame, the projection 25, the hub 7, the armature element 6, the inductors 13, 14, 15 and 16 and the stator element 3. The number of bars in the various series 13—14—15—16 is so proportioned that the bars are alined at certain portions and non-alined or staggered at intermediate portions, and the magnetic flux passes principally through those portions of the machine at which the bars are alined.

In the present construction each series 13—15 contains thirty-five equally spaced bars, and each series 14—16 contains thirty-two equally spaced bars. This arrangement produces three portions of alined bars spaced apart 120° and three intermediate portions of non-alined bars producing a six-pole machine. The armature is provided with a winding which is wound for twice the number of poles as there are alined portions or for six poles, and the windings are connected to the commutator 26 which is secured to the shaft 8 in any well-known manner.

It is seen that if either of the inductors 13—15 or 14—16 is rotated and the other held stationary the alined portions or poles rotate at a greater angular velocity than the rotor, that is, for the rotation of an inductor through the angular distance between two successive bars, the alined portion rotates 120° so that the field has a much higher angular velocity than the inductor, and conversely, the inductor has a lower angular velocity than the field. The direction of rotation of the field with respect to the direction of rotation of the field member depends upon which inductor is rotated. If the inductor 13—15 is rotated the direction of rotation of the field is the same as that of the inductor, and if the inductor 14—16 is rotated the direction of rotation is in opposition to that of the inductor. This is caused by the difference in the angular pitch of bars in the series of the two inductors.

The relation between the angular velocity of the field and the field member is the ratio between the number of bars in one inductor to the number of alined portions, that is, in the present instance, the relation of the angular velocity of the inductor 13—15 to the field is as 3 to 35, and the relation of the angular velocity of the inductor 14—16 to the field is as 3 to 32.

With a current flowing in the magnetizing winding, the armature rotated, and its circuits short circuited or closed through external resistances a torque reaction is produced between the armature and the inductors, that is, the field has a tendency to follow the armature. If the inner inductor 13—15 is released and allowed to rotate the field will follow the armature and strive to attain synchronism, resulting in rotation of the inductor 13—15 in the direction of the rotating field and armature, but at a much lower angular velocity, the angular velocity of the inductor 13—15 at synchronism being three thirty-fifths of the angular velocity of the armature. If the inner inductor 13—15 is locked in position and the outer inductor 14—16 released, the field will again follow the armature and strive to reach synchronism, which will result in an angular velocity of the inductor of three thirty-seconds of the angular velocity of the armature when the field reaches synchronism with the armature. The direction of rotation of the inductor 14—16 is in opposition to that of the armature, however, for reasons which have hereinbefore been set forth. It is evident, therefore, that if the inductor 13—15 is connected to a driven shaft and the inductor 14—16 held stationary that such driven shaft will be rotated in the same direction as the armature, but at a lower speed, and if the inductor 14—16 is connected to the driven shaft and the inductor 13—15 held stationary, that the driven shaft will rotate in the opposite direction from the armature and at a lower speed.

The armature is provided with a series winding and is wound for twice as many poles as there are alined portions in the field element, and means are provided for varying the resistance of the armature circuits so that a varying relation between the speed of the armature and the driven shaft may be obtained. This may be accomplished by arranging slip rings on the shaft 8 and inserting a variable resistance in the external circuit between the brushes which contact with the slip rings, as shown in Fig. 1. For reasons which will hereafter become evident in the description of the complete embodiment of the invention, a commutator 26 will usually be used instead of the slip rings, but when the stator windings are not employed, the slip rings may be used instead of the commutator. By varying the resistance of the armature circuits the speed of the field member may be varied from near synchronism to zero and to near synchronism in the opposite direction without varying the speed of or stopping the rotation of the armature, and the maximum torque over the entire range from zero speed to near synchronism is thus maintained. In this construction, in which the stator is not included, instead of employing slip rings and short circuiting the armature windings, the armature may be provided with a squirrel cage winding.

A construction which excludes the stator windings, contemplates the dissipation of the armature currents in external resistances or short circuits, and this construction is applicable to conditions where a particularly high torque at start and at low speeds is not essential. A much higher efficiency and a greater starting and low speed torque, however, is obtained by introducing the armature current into the stator windings, which are arranged in such a way that the torque produced by the current in the stator windings adds itself to the torque resulting from the reaction between the field and the armature current. For the purpose of commutating the currents generated in the armature, so that they may be conducted to the stator windings, the commutator 26 is employed, and the armature coils are connected to the commutator in any usual manner. Contacting with the commutator are stationary brushes 31—32—33, the brushes being so arranged that polyphase currents can be collected from them by rotating the field and holding the armature stationary. Assuming the brushes belonging to each phase short-circuited or closed through a resistance, the magnetizing coil energized and the field element held stationary, rotation of the armature will induce currents in its windings which will appear as direct currents in the resistances connected to those brushes which have a neutral position with respect to the field poles. The other brushes closed through their respective resistances will also carry a direct current, but of lesser intensity, depending upon the position they occupy on the commutator. If the field element is released and the field allowed to rotate, this neutral position progresses at a corresponding angular velocity. Thus, as the neutral position passes the brushes belonging to the various phases, an alternating polyphase current is flowing in the resistances connecting them. The brushes are connected to the stator windings, so that the polyphase currents collected are introduced into the stator windings. This winding is arranged for as many poles as the winding on the armature and connected for as many phases as obtain in the currents collected from the commutator brushes. In the present embodiment, Fig. 2, I have shown a three phase stator winding, the coils $5^a$ (in full lines) belonging to one phase; the coils $5^b$ (in dot and dash lines) belonging to the second phase; and the coils $5^c$ (in dotted lines) belonging to the third phase. The leads 41—42—43—44—45—46—47—48—49—50—51—52 are so connected to the brushes 31—32—33 that the currents collected will traverse the stator windings in such a way that the flux produced thereby produces a torque which adds itself to the torque resulting from the reaction between the field and the armature current. The polyphase currents collected at the brushes circulate through the stator windings and create a revolving field having the same angular velocity as the field member. The fields of the stator and armature have quadrature relation at standstill of the field member and retain this relation at all speeds of the field member and maintain a torque as long as the armature E. M. F. predominates over the stator E. M. F. The direction of rotation of the driven shaft is dependent as has been heretofore explained, upon which inductor 13—15 or 14—16 of the field member is connected to the driven shaft.

I have stated hereinbefore that the speed of rotation of the field member with relation to the speed of rotation of the armature may be varied by varying the arrangement of the stator windings. This may be accomplished by arranging a controlling device in the circuits between the brushes and the stator windings, and this controlling device I have diagrammatically illustrated in Figs. 4 to 8 inclusive. The leads 41 to 52 inclusive, of the stator windings, terminate at contacts A of the controlling device and the circuits from these leads to the brushes 31—32—33 are completed through either of the contacts B—C—D—E—F of the controlling device, which contacts are connected in different ways, so that the circuits of the stator windings may be varied. In Figs. 4 to 8 inclusive, I have shown five different steps or arrangements of contacts in the controlling apparatus, together with diagrams illustrating the connections effected by the different steps. Different steps in speed are obtained by varying the number of turns in series in the stator winding. The winding of each phase in the illustrated form is divided into two parts and to obtain the largest number of turns in series across the brushes, both parts of each phase are connected in series, and the windings of the three phases are connected in star fashion as shown in Fig. 4. This method of connection produces the lowest speed of the driven element.

The second step in the speed variation is shown in Fig. 5, in which there is a fewer number of turns in series across the brushes.

This is produced by connecting the three phases in delta, leaving the two parts of each phase still in series. The third step, with a still fewer number of turns in series, is shown in Fig. 6, in which the two parts of each phase are connected in multiple and the resultant windings of the three phases in star fashion. The fourth step, with a still fewer number of turns in series is shown in Fig. 7, in which the multiple windings of the three phases are connected in delta fashion. The fifth step, or maximum speed and low torque step, is shown in Fig. 8, in which all of the stator windings are open circuited and the brush leads closed. The lowest speed is obtained with the form of connection shown in Fig. 4 and the speed is increased as the connections shown in Figs. 5 to 8 inclusive are made, the speed of the driven element when the connections of Fig. 8 are employed being near synchronism, or in the present embodiment near either three thirty-fifths, or three thirty-seconds of the speed of the armature, depending on the relative direction of rotation of the driven element and the armature.

In order to obtain variations of the speed, between the speed steps obtained by varying the stator winding connections, variable resistances 54—55—56 are included between the brush leads and the stator winding, and by increasing the variable resistance the speed is lowered and vice versa.

Speed regulation of the driven or field element may be obtained by other suitable means for changing the relative armature and stator potential, such as a transformer or auto-transformer, in which case the winding on the stator need not be changed. The application of this method in its various forms will suggest itself to those familiar with the art and requires no detailed description herein.

I have stated hereinbefore that either or both inductors 13—15 and 14—16 may be locked against rotation or that either may be connected to the driven shaft 57 and the other member held stationary. The inductor 13—15 is provided with a flange 58 which is preferably secured to the series of bars 13. The inner face of the flange 58 is inclined, and disposed in close relation thereto is an annular wedge 59 having an inclined face corresponding to the inclination of the face of the flange. The wedge is movable axially into and out of engagement with the flange 58, and when in engagement, prevents the flange and consequently the inductor 13—15 from rotating. The wedge 59 is supported on bolts 61 which are longitudinally slidable in the frame 2 and which are secured at their outer ends to the screw threaded ring 62. Engaging the ring 62 is a nut 63 which is capable of rotational movement only, being provided for that purpose with suitable means, such as the handle 64. It is seen that as the nut is rotated, the ring 62 and wedge 59 are moved axially, so that the wedge may be readily moved to lock or release the inductor 13—15.

Splined to the bearing 22 is a sleeve 65 which is provided on its inner face with a plurality of slots which are adapted to be engaged by teeth or projections on the outer face of the clutch member 66 which is secured to the hollow shaft 18 to which the inductor 14—16 is secured. The sleeve 65 is movable longitudinally by suitable means, such as the lever 67 and when moved into engagement with clutch member 66 locks the inductor 14—16 against rotation.

The shaft 24, to which the inductor 13—15 is secured, projects beyond the end of the hollow shaft 18 and extends into and supports the driven shaft 57. Secured to shaft 24 between shafts 18 and 57 is an externally toothed clutch member 68. Splined to shaft 57 and engaging sleeve 65 is a sleeve member 69 which is provided on its face with a plurality of slots which are adapted to be engaged by the teeth on clutch members 66 and 68 respectively. The sleeve 69 is rotatable independent of sleeve 65 but is movable longitudinally therewith. When sleeve 65 is moved longitudinally into engagement with clutch member 66, thereby locking the inductor 14—16, sleeve 69 is moved into engagement with clutch member 68, connecting the inductor 13—15 with the driven shaft 57. When the sleeve 65 is moved in the opposite direction, sleeve 69 is moved into engagement with clutch member 66, connecting the inductor 14—16 with the driven shaft 57. The inductor 13—15 is locked against rotation by the wedge 59.

The bars in the series 13—14—15—16 are each composed of a bolt 71, preferably square in cross section, upon which the laminations forming the bars are placed. The bar series 14 is connected to the bar series 16, which is directly secured to the spider 17, by the annular plate 72. The spiders 17 and 23 are preferably curved in cross section so that the spider hubs may occur conveniently within the frame of the machine, thereby producing a compact construction. The spiders and the side of the frame 2 which contains the bearing 21 are made of non-magnetic material, such as brass, so that the magnetic flux will travel in its proper path.

In this machine, since the rotating field has a higher angular velocity than the field element, in one case thirty-five thirds higher and in the other case thirty-two thirds higher, the maximum angular velocity of the driven shaft is three thirty-fifths or three thirty-seconds of the angular velocity of the armature, depending upon the direction of rotation of the driven shaft with respect to the armature. The speed of the driven shaft may be varied from zero to near synchronism in either direction, for a constant speed of rotation of the armature. The torque of the driven shaft at near synchronism is approximately eleven times the torque of the armature shaft. The highest possible torque that the driven member is able to develop is maintained over the entire range of speed from zero to near synchronism in either direction at a very high efficiency on account of the fact that all of the energy is consumed in the machine and is not dissipated in external resistances, that is, all of the energy of the driver is transmitted to the driven element at all speeds of operation except such portion of the energy as is required to cover the losses in the machine.

When it is desired to obtain a speed of the driven element in excess of the speed of the driving element, the shaft 57 may constitute the driving shaft and shaft 8 the driven shaft, in which case the speed of shaft 8 may approach at its maximum thirty-five thirds or thirty-two thirds of the speed of shaft 57, depending upon the direction of rotation of shaft 8 with respect to shaft 57.

I claim:

1. An electric power transmission device comprising, in combination with a driving and a driven shaft, a field element including two independently rotatable inductors coöperative by their relative rotation to produce a revolving flux path, means for locking one of the inductors against rotation and for securing the other inductor to one of the shafts, an armature secured to the other shaft, and a source of magnetizing flux cutting the armature and field element.

2. An electric power transmission device comprising, in combination with a driving and a driven shaft, a field element including two independently rotatable series of magnetic bars forming inductors and operative by their relative rotation to produce a revolving flux path, means for locking one of the inductors against rotation and for securing the other inductor to one of the shafts, an armature secured to the other shaft, and a source of magnetizing flux cutting the armature and field element.

3. An electric power transmission device comprising, in combination with a driving and a driven shaft, a field element including two concentric and independently rotatable series of equally spaced magnetic bars forming inductors, the bars of the two series differing in number, means for locking either of the inductors against rotation and for securing the other inductor to one of the shafts, an armature secured to the other shaft, and a source of magnetizing flux cutting the armature and field element, whereby the torque reaction between the inductors and the armature current tends to rotate one inductor in one direction and the other inductor in the opposite direction.

4. An electric power transmission device comprising an armature provided with a winding, a stator provided with a winding which is connected to the armature winding, a field element comprising two independently rotatable inductors in inductive relation to said armature and stator, means for producing a common magnetic flux traversing said armature, field element and stator, a driven shaft, means for locking one of said inductors against rotation, and means for connecting the other field member to the driven shaft.

5. An electric power transmission device comprising an armature provided with a winding, a commutator connected to said winding, stationary brushes engaging said commutator, a stator provided with a winding, conductors connecting the brushes with the stator windings, a field element comprising two independently rotatable inductors in inductive relation to said armature and stator, means for locking one of said inductors against rotation, and means for changing the relative armature and stator potential.

6. An electric power transmission device comprising an armature provided with a winding, a commutator connected to said winding, stationary brushes engaging said commutator, a stator provided with a winding, conductors connecting the brushes with the stator windings, a field element comprising two independently rotatable inductors in inductive relation to said armature and stator, means for locking one of said inductors against rotation, and variable resistances in the conductors between the brushes and stator windings.

7. An electric power transmission device comprising an armature provided with a winding, a commutator connected to said winding, stationary brushes engaging said commutator, a stator provided with a winding, conductors connecting the brushes with the stator windings, a field element comprising two independently rotatable inductors in inductive relation to said armature and stator, means for locking one of said inductors against rotation, and means for varying the number of turns in series in the stator winding.

8. An electric power transmission device comprising an armature provided with a winding, a commutator connected to said winding, stationary brushes engaging said commutator, a stator provided with a winding, conductors connecting the brushes with the stator windings, a field element comprising two independently rotatable inductors in inductive relation to said armature and stator, means for locking one of said inductors against rotation, means for varying the number of turns in series in the stator winding, and variable resistances in the conductors between the brushes and stator windings.

9. An electric power transmission device comprising an armature provided with a winding, a commutator connected to said winding, stationary brushes engaging said commutator, a stator provided with a winding, conductors connecting the brushes with the stator windings, a field element comprising two independently rotatable inductors each composed of a circumferential series of spaced magnetic bars in inductive relation to said armature and stator, means for locking one of said members against rotation, and means for changing the relative armature and stator potential.

10. An electric power transmission device comprising an armature provided with a winding, a commutator connected to said winding, stationary brushes engaging said commutator, a stator provided with a winding, conductors connecting the brushes with the stator windings, a field element comprising two independently rotatable inductors each composed of a circumferential series of spaced magnetic bars in inductive relation to said armature and stator, the bars of the two series differing in number, means for locking either of the inductors against rotation, a source of magnetizing flux cutting the armature, field element and stator, whereby the torque reaction between the inductors and the armature current tends to rotate one inductor in one direction and the other inductor in the opposite direction, and means for changing the relative armature and stator potential.

11. In an electric power transmission device, in combination with a driven armature, two independently rotatable field members inductively related to the armature, and means for locking either field member against rotation, the field members being so constructed that when the complementary field member is stationary the torque reaction between one field member and the armature is in one direction and that between the other field member and the armature is in the opposite direction.

In witness whereof, I subscribe my signature, in the presence of two witnesses.

ALFONS H. NEULAND.

Witnesses:
W. W. HEALEY,
M. E. EWING.